United States Patent [19]
Childers et al.

[11] 3,935,136
[45] Jan. 27, 1976

[54] PREPARATION OF IMPACT PLASTIC COMPOSITIONS

[75] Inventors: Clifford W. Childers; Earl Clark; Wallace D. Johnson, all of Bartlesville, Okla.

[73] Assignee: Phillips Petroleum Company, Bartlesville, Okla.

[22] Filed: Feb. 7, 1972

[21] Appl. No.: 224,309

[52] U.S. Cl. ............... 260/4 R; 260/4 AR; 260/878; 260/879; 260/880 R; 260/880 B
[51] Int. Cl.².. C08L 7/00; C08L 23/00; C08L 9/00; C08L 47/00
[58] Field of Search ..... 260/880 R, 4 R, 4 AR, 878, 260/879, 880 R, 880 B, 881

[56] References Cited
UNITED STATES PATENTS

| | | | |
|---|---|---|---|
| 3,243,481 | 3/1966 | Ruffing et al. | 260/880 |
| 3,370,105 | 2/1968 | De Bell | 260/880 |
| 3,436,371 | 4/1969 | Ware | 260/880 |
| 3,445,543 | 5/1969 | Gruver | 260/880 |
| 3,536,785 | 10/1970 | Wilbur | 260/93.5 |
| 3,644,587 | 2/1972 | Finberg | 268/880 |
| 3,660,325 | 5/1972 | Bremner | 260/880 |
| 3,660,534 | 5/1972 | Carrock | 260/880 |

*Primary Examiner*—Joseph L. Schofer
*Assistant Examiner*—Herbert J. Lilling

[57] ABSTRACT

High impact plastic compositions are prepared by dissolving an unsaturated elastomer in a vinylidene group-containing monomer or monomers, polymerizing in a suspension polymerization system, and subsequently cross-linking the product in a hot-mixing step employing a peroxide.

26 Claims, No Drawings

PREPARATION OF IMPACT PLASTIC COMPOSITIONS

FIELD OF THE INVENTION

This invention relates to high impact plastic compositions.

BACKGROUND OF THE INVENTION

It is known that high impact strength plastics can be prepared by polymerizing vinylidene group-containing monomers in the presence of elastomers. This polymerization can be carried out in a latex system; in a bulk system; by a combination method in which the vinylidene group-containing monomers containing the rubbery polymer dissolved therein are polymerized to a low degree of conversion and the partially polymerized mixture emulsified to form a latex, or put into a suspension, for the remainder of the polymerization. In these prior art processes the elastomeric component generally has been crosslinked before or during the polymerization of the vinylidene group-containing monomers.

SUMMARY OF THE INVENTION

We have discovered that impact plastics which exhibit a combination of very good properties can be made by dissolving an unsaturated elastomer in vinylidene group-containing monomers, and then polymerizing the rubber-in-monomer solution or cement in a suspension polymerization system. The polymeric product is obtained in the form of small beads readily recovered from the suspension polymerization system. The polymeric product is hot mixed in the presence of a free radical generating crosslinking agent so as to crosslink the rubbery component within the matrix of the resinous component.

Our invention utilizes the effective and low-cost of a suspension polymerization process to produce products with desirable properties of high impact strength, good flow characteristics, and good color quality.

DETAILED DESCRIPTION OF THE INVENTION

In our invention, an unsaturated elastomer is dissolved in at least one vinylidene group-containing monomer to form a solution, preferably in at least two such monomers of which one is a nitrile. The rubber-in-monomer solution or cement is suspended in water and polymerized using a free radical generating initiator such as a peroxy compound or an azo compound, preferably under conditions such that the elastomeric component is maintained essentially gel-free. The polymeric product is hot mixed in the presence of a free radical generating crosslinking agent such as a peroxy compound to crosslink the rubbery component to produce a product of excellent properties.

Elastomers

The unsaturated elastomers can be characterized as those rubbery polymers having at least enough unsaturation to be vulcanizable. The unsaturated elastomers include both natural rubbers and synthetic polymers. The polymers include polymers of conjugated dienes such as those containing 4 to 12 carbon atoms per molecule, preferably for commercial availability those of 4 to 8 carbon atoms per molecule. Examples of these monomers include 1,3-butadiene, isoprene, piperylene, 2,4-dimethyl-1,3-butadiene, 1,3-octadiene, 4,5-diethyl-1,3-octadiene, and the like. These conjugated dienes can be polymerized to form homopolymers or copolymerized one with another. Conjugated diene polymers as a class also include copolymers formed by polymerizing one or more conjugated dienes with one or more copolymerizable monovinyl-substituted aromatic compounds, such as those of 8 to 20, more particularly for commercial availability 8 to 12, carbon atoms per molecule, including styrene, various of the alkyl styrenes, such as ethyl styrene, halostyrenes such as 2,3-dichloro styrene; and also other polymerizable ethylenically unsaturated monomers such as the nitriles such as acrylonitrile and methacrylonitrile, and the 1-monoolefins of 2 to 8 carbon atoms per molecule, such as ethylene, propylene, octene, and the like.

Exemplary of the unsaturated elastomers are cis-polybutadiene, emulsion polybutadiene, vinyl-polybutadiene, cis-polyisoprene, natural rubber, GRS rubbers, butadiene/styrene copolymers of both random and block monomer distribution emulsion or solution polymerized, butadiene/acrylonitrile copolymers, ethylene/propylene/diene terpolymers (EPDM), partially hydrogenated polybutadiene or butadiene/styrene copolymers, and the like. Of course, two or more unsaturated vulcanizable rubbers can be used, if desired, in forming the rubber-in-monomer cement.

VINYLIDENE GROUP-CONTAINING MONOMERS

The vinylidene group-containing monomers include those which are polymerizable in the presence of the described elastomers and can be at least partially grafted to elastomers dissolved in the monomers. Thus, the vinylidene group-containing monomers include vinyl-substituted aromatic compounds, alpha,beta-unsaturated nitriles, esters of acrylic acid, esters of alkacrylic acid, and vinyl esters such as vinyl acetate, vinyl butyrate, and the like. The number of carbon atoms per molecule can range from 3 to such as 30 carbon atoms per monomer molecule, presently preferably up to 18 carbon atoms per molecule, more preferably up to about 12 carbon atoms per molecule. The monomers include, for example, the presently preferred styrene, acrylonitrile, and methacrylonitrile; as well as $\alpha$-methylstyrene, methyl methacrylate, 4-vinylbiphenyl, 2-vinylnaphthalene, and the like. Another group of useful monomers are the maleinimides, olefinically unsaturated heterocyclic compounds polymerizable through the olefinic unsaturation. Any related monomer such as the dialkyl maleates or fumarates also is useful within the context of out invention. Mixtures of monomers can be employed.

In our invention, the unsaturated elastomer is dissolved in the vinylidene group-containing monomer or monomers. The amount of elastomer so dissolved can be of any broad range suitable or desired depending on the particular elastomer and monomer characteristics. For commercial convenience in handling in suspension polymerization processed, a range of about 5 to 40 percent by weight based on the combined weight of elastomer and monomers presently is considered most convenient. Presently preferred are the use of mixtures of monomers wherein a vinylidene nitrile-containing monomer is one component thereof and constitutes in admixture up to about 95 weight percent of the monomer mixture. Especially useful products are obtained by the use of styrene/acrylonitrile mixtures containing up to about 50, preferably about 20 to 40, parts by weight of acrylonitrile per 100 parts of monomer mixture.

SUSPENSION POLYMERIZATION

The rubber-in-monomer solution is placed in a suspension polymerization system with water as the continuous phase. It has been found desirable in order to minimize reactor fouling, to make a relatively rich suspension of the cement in a small to moderate amount of water by means of a centrifugal pump or the like, and then add the rich suspension to the main water phase in the reactor. By preforming the suspension in this manner, reactor agitation need only be sufficient to maintain suspension and to provide suitable heat transfer for control of temperature during polymerization. This method also appears to assist in producing a more uniform bead size in the polymer product. The level of or intensity of agitation used during the premixing provides a degree of control of the bead size of the polymeric product. Relatively large bead particles with minimum fines are preferable so as to minimize loss of fines during subsequent dewatering and separation steps, and to facilitate subsequent handling of the bead-like polymer in the later cross-linking step.

The solution of elastomer in the grafting monomers is stirred in the suspension system in the presence of polymerization initiators, water, suspending agents, and, where desired, additionally with molecular weight regulators.

Although the polymerization reaction may proceed thermally without added catalysts, it is presently preferable to incorporate a catalyst system suitable for polymerizing the monomers, particularly the free-radical generating initiators. Initiators useful in the context of our invention include the monomer-soluble organic peroxides and the azo compounds. Exemplary catalysts include monomer soluble di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide isopropyl carbonate, 2,5-dimethyl-2,5-di(tert-butylperoxy)hexane, 2,5-dimethyl-2,5-di(tert-butylperoxy)hexyne-3, tert-butyl hydroperoxide, cumene hydroperoxide, p-menthane hydroperoxide, cyclopentane hydroperoxide, diisopropylbenzene by hydroperoxide, p-tert-butylcumene hydroperoxide, pinane hydroperoxide, 2,5-dimethylhexane-2,5-dihydroperoxide, and the like, and mixtures thereof, as well as any of the monomer soluble azo initiators useful in suspension polymerization systems, such as α-(tert-butylazo)isobutyronitrile, and the like.

Suspending agents employed include finely divided inorganic solids such as titanium dioxide, tricalcium phosphate, and the like, which can be formed separately and added to the suspension system, or preferably can be formed in situ for most effective and useful results as a most uniformly finely divided suspending agent.

Chain transfer agents may be added, if desired, to the polymerization mixture for molecular weight control of the polymer. Chain transfer agents include the normal or tertiary alkyl mercaptans having from 4 to 16 carbon atoms per molecule such as t-dodecylmercaptan and n-dodecylmercaptan. Other useful agents include the lower alkyl xanthogens, such as diisopropyl xanthogen; α-bromoethylbenzene; α-chloroethylbenzene; carbon tetrabromide; α-methylstyrene dimer; and the like. Such modifiers can be added in an amount sufficient for effect desired, and typically in about 0.4 to 1.5 weight per cent of the monomer-elastomer.

The amount of water employed in the suspension polymerization can vary widely depending on the reactor employed, agitation means, and the like. It is presently preferred to employ sufficient water such that the final suspension admixture contains from about 20 to 60 percent by weight of monomer-elastomer based on the total weight of the entire mixture including water. The time employed for polymerization is that sufficient for the conversion desired, and can vary over a wide range. Time varies depending on other reaction parameters, such as on the temperature chosen, and can range from a very few minutes to such as 48 hours or more, preferably at present from 2 to 16 hours. The temperature employed in the suspension polymerization is at least sufficient to induce decomposition of the free radical initiator, and preferably below that which would cause gel formation in the elastomeric component. A suitable temperature range is from about 50° to 150° C.

A particular advantage of one aspect of our invention lies in the employment of two free radical generating initiators, such as peroxides, both present during polymerization. In this aspect, the initiators and suspension polymerization temperatures are selected such that one of the free radical initiators is activated for monomer polymerization purposes, but the polymerization temperature selected is below the activation temperature of the second free radical initiator. Thus, polymerization is obtained without gel formation in the polymerization step. In a subsequent higher temperature blending step, the second initiator is activated to crosslink the polymer.

At the end of desired suspension polymerization reaction, stirring is ceased, and the polymeric product in the form of small beads is allowed to settle. Water washing or acid washing followed by water washing is not a necessity. However, if it is desired to remove the minor amount of calcium phosphate or other suspending agent present, the beads can be water washed before drying. Except in the cases of transparent polymers, the removal of the suspending agent usually is not a necessity. The product finally is dried and is ready for the hot mixing step.

HOT MIXING-CROSSLINKING

Crosslinking is conducted by hot-mixing of the polymeric product in the presence of a free radical generating agent, such as peroxy compound.

The amount of free radical cross-linking agent employed can range widely depending on the elastomers and monomers employed, the extend of crosslinking desired, and the cross-linking agent or agents employed. The presently preferred range is from about 0.04 to 18.5 milligram equivalents of peroxy oxygen (—O—O—) per 100 grams of polymer (mehp). The free radical cross-linking agent preferably is added to the mixture of grafting monomers prior to the polymerization step for commercial convenience and effectiveness, and can be added either before or after dissolving the unsaturated elastomer in the monomers. Of course, the particular cross-linking agent chosen must have a decomposition temperature above the temperature employed in the polymerization step in order for it to be added at any point prior to the polymerization itself. Any of the cross-linking agents can be conveniently added, if desired, during the hot mixing which method also provides essentially uniform dispersal of the cross-linking agent throughout the fluxing polymer.

The peroxy compounds which can be employed as cross-linking agents include inorganic and organic peroxides including the hydroperoxides, and encompass any peroxy compound effective for the purpose. These peroxy compounds can contain from 4 to 40 carbon atoms per molecule. The organic peroxides can be substituted with non-peroxy members such as halogen, hydroxy radicals, ether and/or ester linkages, and the like. The inorganic peroxides include such as calcium peroxide, barium peroxide, zinc peroxide, lead peroxide. Mixtures can be employed. Examples of suitable peroxides include:

methyl n-propyl peroxide
diethyl peroxide
dieicosyl peroxide
dicyclohexyl peroxide
bis(2,4,6-trimethylcyclohexyl)peroxide
bis(3,5-dichlorocyclohexyl) peroxide
bis(4-phenylcyclohexyl) peroxide
bis(4-octenyl) peroxide
dilauroyl peroxide
dibenzoyl peroxide
dicrotonyl peroxide
dibenzyl peroxide
methyl 2-n-propyl-3-butenyl peroxide
bis[diisopropyl-(4-isopropylphenyl)methyl]peroxide
bis[dimethyl-(4-tert-butylphenyl)methyl]peroxide
bis[(4-chlorobenzoyl)]peroxide
bis(2-propoxy-n-hexyl) peroxide
n-pentyl 5,8-diphenyldodecyl peroxide
bis(9,10-dihydroxydecyl) peroxide
bis(2-hydroxyheptyl) peroxide
eicosyl hydroperoxide
triacontanyl hydroperoxide
phenylcyclohexane hydroperoxide
3-cyclohexenyl hydroperoxide
4-cyclopentyl-n-butyl hydroperoxide
diisopropylbenzene hydroperoxide[dimethyl-(4-isopropylphenyl)hydroperoxymethane]
(4-ethoxyphenyl) methyl hydroperoxide
dimethyl(3-methoxyphenyl)hydroperoxymethane
peroxybenzoic acid
peroxybutyric acid
tert-butyl peroxybenzoate
di-tert-amyl diperoxyphthalate
tert-dodecyl peroxyacetate.

Peroxides formed by the oxidation of terpene hydrocarbons such as pinane, alpha-pinene, p-menthane, and turpentine can also be used. Presently preferred peroxides include bis($\alpha,\alpha$-dimethylbenzyl) peroxide, i.e., $\alpha$-dicumyl peroxide; di-tert-butyl peroxide; cumene hydroperoxide; tert-butyl hydroperoxide and 2,5-dimethyl-2,5-di-tert-butylperoxyhexane.

The hot mixing step can be carried out in various types of polymer processing machines, such as internal mixers of which the Brabender Plastograph and Ko-Kneader are illustrative. Extruders employed in plastics processing also can be employed in this step, especially at temperatures above about 225° C. Lower temperatures can be employed with the internal mixer type machines. The temperature employed should be at least sufficient to flux the polymer and to decompose the free radical generating cross-linking agent and can range up to about 350° C. The presently preferred range is from about 150° to 300° C. for the hot mixing step.

Polymer stabilizers, e.g., antioxidants, can be added either before or after polymerization, and either before or after the hot mixing step, depending upon the type of antioxidant employed. The polymers can be compounded with a wide variety of fillers, plasticizers, pigments, reinforcing fibers, and the like, for various purposes.

EXAMPLES

The examples presented below are intended to demonstrate our invention for the preparation of high impact plastics. Particular elastomers, monomers, and other agents, as well as particular conditions employed should be considered as illustrative of our invention and not as limitative of the reasonable scope thereof.

EXAMPLE I

A commercially available butadiene/styrene rubbery block copolymer was dissolved in a mixture of a styrene and acrylonitrile and polymerized in a suspension polymerization system. Portions of resulting polymer were hot mixed with and without a peroxy-oxygen cross-linking compound and the properties of the products were measured.

Preparation of Polymer Solution (A)

|  | Parts by Weight |
|---|---|
| Butadiene/Styrene 75/25 block copolymer (a) | 35 |
| Styrene/acrylonitrile 75/25 mixture | 165 |
| Lecithin solution (b) | 2 |
| Acetic Acid solution (c) | 2 |
| Thiol mixture (d) | 0.8 |
| Benzoyl peroxide | 1 |

(a) A butadiene/styrene (75/25) block copolymer having about 18 per cent block polystyrene and a Mooney viscosity ML-4 at 212°F ASTM D1646-63 of about 47, commercially available as Solprene* 1205 from Phillips Petroleum Company.
(b) A solution of 0.008 part lecithin in 1 part of the 75/25 styrene acrylonitrile monomer mixture.
(c) A solution of 0.012 part of glacial acetic acid in 1 part of the 75/25 styrene/acrylonitrile monomer mixture.
(d) A mixture of tertiary, primarily $C_{10}$ and $C_{11}$, thiols having an average of 10.5 carbons per molecule, available commercially as Sulfole* 105 from Phillips Petroleum Company.
*Trademark The polymer solution was prepared by adding the solid polymer cut into small pieces to the major portion of the styrene/acrylonitrile monomer mixture and allowing the mixture to stand at about 76° F. until the polymer dissolved. The solution contained 17.5 percent by weight polymer. The acetic acid solution, lecithin solution, and thiol mixture then were added to the polymer solution followed by the benzoyl peroxide.

PREPARATION OF SUSPENSION AGENT DISPERSION (B)

A solution of $Na_3PO_4\cdot12H_2O$ in water was prepared and to it was added a solution of $CaCl_2\cdot2H_2O$ and sodium octyl sulfate. This formed the suspending agent $Ca_3(PO_4)_2$ in a very finely divided form designated dispersion (B):

Suspending Agent Recipe

|  | Parts by Weight |
|---|---|
| $H_2O$ | 250 |
| $Na_3PO_4\cdot2H_2O$ | 2.8 |
| $CaCl_2\cdot2H_2O$ | 2 |
| Sodium octyl sulfate | 0.28 |
| $H_2O$ | 50 |

For the polymerization, 200 g of polymer solution (A) and 305 g of suspending agent dispersion (B) were admixed and agitated at about 80° C. for eight hours.

The reactor contents were discharged into 1.5 liters of water, and stirred while 10 ml of 12 N HCl was added to solubilize the suspending agent. The liquid phase was discarded, and the separated solid polymer beads were washed in 1.5 liters of hot water, filtered, and dried under vacuum at 80° C.

Samples were prepared for testing by mixing 65 grams of the fluxed polymer at 185° C. in a Brabender Plastograph at 100 rpm for 3 minutes, then adding 1.5 parts by weight per 100 parts of polymer of an antioxidant mixture of 0.3 parts of 2,6-di-tert-butyl-4-methylphenol, 0.7 parts of trisnonylphenyl phosphite, and 0.5 parts dilaurylthiodipropionate. Mixing was continued for 2 minutes, the mixture removed, and samples molded under conditions specified for the various ASTM test methods. Monomer conversion results and the properties of the polymer from the suspension process are shown below in Table I as Run 1.

Samples of the polymer of Run 1 were cross-linked by mixing the fluxed polymer at 185° C. in a Brabender Plastograph with 1.0 part of calcium stearate at 100 rpm for 3 minutes after which 0.1 part of bis($\alpha,\alpha$-dimethylbenzyl) peroxide was added. Mixing was continued for 3 minutes after which 1.5 parts of the antioxidant mixture employed in the control runs of Table I was added. Mixing was continued for an additional 2 minutes and the polymer test specimens prepared as described before. Calcium stearate, a processing aid, was present in these runs so as to reduce sticking of the polymer to mixing chamber surfaces.

TABLE I

| Run No. | Conv. % | Melt Flow g/10 min. (a) | Modulus psi × $10^{-3}$ (b) | Tensile psi (c) | Elong. % (c) | Izod Impact ft.lbs/in. notch (d) |
|---|---|---|---|---|---|---|
| 1 | 89 | 2.69 | 340 | 4700 | 4 | 0.47 |
| 2 | — | 0.65 | 295 | 5030 | 16 | 11.50 |

(a) ASTM D 1238-65T Condition G
(b) ASTM D 790-63
(c) ASTM D 412-66
(d) ASTM D 256-56.

The results in Run 2 demonstrate tough high impact plastics can be prepared according to our invention.

EXAMPLE II

Further runs were carried out employing the recipe and procedures as described in Example I, except using a styrene/acrylonitrile weight ratio of 70/30. Run 3 is a control run without the step of hot mixing with a peroxide.

TABLE II

| Run No. | Conv. % | Melt Flow g/10 minutes | Modulus psi × $10^{-3}$ | Tensile psi | Elong. % | Izod Impact ft.lbs/in. notch |
|---|---|---|---|---|---|---|
| 3 | 93 | 2.35 | 336 | 5410 | 6 | 1.16 |
| 4 | — | 0.34 | 291 | 4820 | 20 | 11.18 |

EXAMPLE III

Runs were conducted employing a polybutadiene prepared in a solution polymerization system as the elastomer component in preparing polymers according to our invention. The polymer solution (A) recipe for this example is as follows:

Polymer Solution Recipe (A)

| | Parts, by weight |
|---|---|
| Polybutadiene (a) | variable |
| Styrene/acrylonitrile 75/25 mixture (SAN) | variable |
| Lecithin solution | 2 |
| Acetic acid solution | 2 |
| Thiol mixture (b) | 0.8 |
| Benzoyl peroxide | 1 |
| Water | 2 |

(a) A polybutadiene having a Mooney viscosity ML-4 at 212°F of about 45, cis-1,4 content of about 38 percent, trans-1,4 content of about 53 percent and an inherent viscosity of about 2.2, available commercially as Solprene* 200 from Phillips Petroleum Company.
(b) Sulfole* 105

The polymer solutions for these runs were prepared similarly to those of Example I except that the water in the above recipe was dispersed in the polymer solution by agitation for 1 hour at 50°C. The suspending agent recipe for dispersion (B) and the amounts of solution (A) and dispersion (B) employed also were the same as in Example I. The mixtures were agitated at 80° C. for 7.75 hours during the polymerization step. Polymer product separation procedures were the same as those employed in Example I. Conversion was 88 to 89 percent in all runs.

A 65g portion of each polymer was mixed with 0.5 part calcium stearate and 0.1 part of bis($\alpha,\alpha$-dimethylbenzyl)peroxide at 185° C. at 100 rpm in a Brabender Plastograph for three minutes after the mixture fluxed. Next, 1.5 parts of the antioxidant mixture described in Example I was added with continued mixing for 2 minutes. Sample specimens were prepared as described before.

TABLE III

| Run No. | Polybutadiene Parts | SAN Parts | Melt Flow g/10 min | Tensile psi | Elongation % | Izod Impact ft.lbs/in. notch |
|---|---|---|---|---|---|---|
| 5 | 22 | 174 | 0.88 | 5520 | 22 | 6.24 |
| 6 | 25 | 171 | 0.68 | 4870 | 49 | 8.06 |
| 7 | 28 | 168 | 0.49 | 4600 | 25 | 9.19 |

The above results further demonstrate that high impact plastics with good balance of properties can be prepared according to our invention by employing a polybutadiene as the rubbery component.

EXAMPLE IV

Additional runs were carried out employing a high cis-polybutadiene as the rubbery component. In all other respects these runs were comparable to the runs described in Example III.

TABLE IV

| Run No. | High-cis (a) Rubber parts | SAN parts | Conv. % | Melt Flow g/10 min | Tensile psi | Elong. % | Izod Impact ft.lbs/in. notch |
|---|---|---|---|---|---|---|---|
| 8 | 22 | 174 | 91 | 1.60 | 5510 | 15 | 5.36 |
| 9 | 25 | 171 | 93 | 0.75 | 5310 | 16 | 7.75 |
| 10 | 28 | 168 | 88 | 1.03 | 4480 | 52 | 7.99 |

(a) A polybutadiene prepared in a solution process having a Mooney viscosity ML-4 at 212°F of about 45 and a cis-1,4 content of at least 85 percent, available commercially as Cis-4* 1203 from Phillips Petroleum Company.

These results show that the process of our invention produces high impact plastics with a good balance of properties when employing a high cis-polybutadiene as the rubbery component.

EXAMPLE V

Further runs were conducted in which an azo compound was employed as the initiator in the polymerization step rather than an organoperoxide. The polymer solution (A) recipe for this example is shown below.

Polymer Solution Recipe (A)

|  | Parts, by Weight |
|---|---|
| Butadiene/styrene 75/25 block copolymer (a) | 35 |
| Styrene/acrylonitrile (75/25) mixture | 165 |
| Lecithin | 0.016 |
| Acetic Acid solution | 0.024 |
| Thiol mixture (b) | 0.6 |
| α-(tert-butylazo)isobutyronitrile (AZO) | variable |

(a) As described in Example I, Polymer Solution Recipe, Note (a)
(b) Sulfole* 105

The polymer solution (A) and the suspending agent dispersion (B) were prepared and mixed under the conditions described in Example I. Polymerizations were conducted for 7.75 hours at 80° C. The polymer recovery and sample specimen preparation procedures were as described in Example I.

A 65 g portion of each polymer was mixed with 1 part by weight of calcium stearate and 0.1 part bis(α,α-dimethylbenzyl)peroxide in a Brabender Plastograph at 210°C at 100 rpm for a time of 4.5 minutes after the mixture fluxed. Next, 1.5 parts of the antioxidant mixture described in Example I were added and mixing continued for 2 minutes.

TABLE V

| Run No. | AZO parts | Conv. % | Melt Flow g/10 min | Modulus psi × 10$^{-3}$ | Tensile psi | Elong. % | Izod Impact ft.lbs/in. notch |
|---|---|---|---|---|---|---|---|
| 11 | 1.0 | 94 | 1.12 | 303 | 5070 | 51 | 5.30 |
| 12 | 1.5 | 95 | 2.11 | 288 | 4710 | 58 | 4.25 |

These results show that azo initiators also can be employed for the polymerization step of our invention and that impact plastics with good balance of properties thus can be prepared.

EXAMPLE VI

Other runs were conducted in which a crosslinking agent was incorporated into the polymer by carrying out the suspension polymerization step in the presence of the crosslinking agent.

The polymer solution (A) recipe employed is shown below.

Polymer Solution Recipe

|  | Parts, by weight |
|---|---|
| Butadiene/Styrene 75/25 block copolymer (a) | 35 |
| Styrene/acrylonitrile 75/25 mixture (SAN) | 161 |
| Lecithin solution | 2 |
| Acetic acid solution | 2 |
| Thiol mixture (b) | 0.8 |
| Benzoyl peroxide | 1 |
| Crosslinking agent (CLA)(c) | variable |
| Water | 2 |

(a) As described in Example I, Polymer Solution Recipe, Note (a).
(b) Sulfole* 105
(c) bis(α,α-dimethylbenzyl)peroxide.

After the rubbery polymer was dissolved in the SAN mixture, the water was dispersed therein by agitation of the mixture for 2 hours at 50° C., the other ingredients were added, and the peroxides added last. The suspending agent dispersion (B) and the procedure for mixing the solution (A) and dispersion (B) were the same as described in Example I. The polymerization step was conducted at 80° C. for 7.75 hours and the polymers isolated. Conversion in each run was 90 to 92 percent. Samples were prepared in the same manner as described in Example I. 65 G of each polymer was mixed at 190° C. in a Brabender Plastograph with 0.5 part by weight of calcium stearate, and after the mixture fluxed mixing continued at 100 rpm for 3 minutes. Next, 1.5 parts of the antioxidant mixture described in Example I were added and mixing continued for 2 minutes.

TABLE VI

| Run No. | CLA parts | Conv. % | Melt Flow g/10 min | Modulus psi × 10$^{-3}$ | Tensile psi | Elong. % | Izod Impact ft.lbs/in. notch |
|---|---|---|---|---|---|---|---|
| 13 | 0.2 | 92 | 0.97 | 290 | 5180 | 14 | 8.64 |
| 14 | 0.4 | 90 | 1.09 | 277 | 5010 | 31 | 7.58 |

The results above for Runs 13 and 14 demonstrate that impact plastics with very good balance of properties are obtained by incorporating the free radical generating crosslinking agent into the polymer during the polymerization step.

EXAMPLE VII

Further runs were made employing the recipes shown below.

Polymer Solution

| | Amount |
|---|---|
| Butadiene/styrene 75/25 block copolymer (a) | 3.9 lb. |
| Styrene | 15.5 lb. |
| Acrylonitrile | 6.6 lb. |
| Lecithin solution | 0.8 g. |
| Acetic acid solution | 1.4 g. |
| tert-Dodecyl thiol | 71 g. |
| tert-Butyl 2-ethylperhexanoate | 35 g. |
| bis($\alpha,\alpha$-dimethylbenzyl)peroxide | 11.8 g. |

(a) As described in Example I, Polymer Solution Recipe, Note (a).

Suspending Agent

| | Amount |
|---|---|
| Part 1 | |
| Water | 20.8 lb. |
| $Na_3PO_4 \cdot 12H_2O$ | 106 g. |
| Part 2 | |
| Water | 4.2 lb. |
| $CaCl_2 \cdot 2H_2O$ | 76 g. |
| Sodium octyl sulfate | 2.7 g. |

In forming the polymer solution, the butadiene/styrene copolymer was dissolved in the styrene at room temperature. Acrylonitrile was added next, followed by the lecithin solution, the acetic acid solution, and the thiol. The aqueous phase containing the suspending agent was formed by mixing parts 1 and 2 of the above suspending agent mixture.

The polymer solution was added to the reactor containing the suspending agent dispersion over a period of about 15 minutes, with stirring, at a temperature of about 170° F. The polymerization reaction continued for about 8 hours at about 175° F. The reaction mixture was allowed to cool to room temperature and then stirred with the addition of 235 ml of 3N HCl. The reaction mixture was filtered and the polymer beads washed twice with about 2.5 gal. of water in each washing step. The polymer beads were dried under vacuum. Monomer conversion in this run was about 85 percent.

The polymer prepared as described above was employed in runs to demonstrate the importance of the hot mixing step in the process of our invention. In Run 15 the polymer beads were poured into a mold, preheated without pressure for 3 minutes, then for 10 minutes at 40,000 psi and 205° C. This sample was molded into ⅛ inch slabs for physical property testing. In Run 16 a portion of the same polymer was hot mixed at 210° C. for 3 minutes under nitrogen in a Brabender Plastograph with 1 part by weight of an antioxidant mixture as described in Example I and 0.5 part by weight of calcium stearate per 100 parts by weight of polymer. The mixture was molded into ⅛ inch slabs for physical property testing.

TABLE VII

| Run No. | Melt Flow g/10 min. | Modulus psi $\times 10^{-3}$ | Tensile psi | Elongation % | Izod Impact ft.lbs/in. notch |
|---|---|---|---|---|---|
| 15 | 0.16 | 83 | 1670 | 18 | 0.2 |
| 16 | 2.56 | 316 | 5800 | 18 | 7.3 |

The results in Table VII demonstrate the remarkable improvement in melt flow, modulus, tensile, and impact properties achieved by the hot mixing procedure according to our invention.

EXAMPLE VIII

A run was made in which a high impact strength transparent resin was prepared by the method of our invention. The auxiliary suspending agent was omitted from this run.

Polymer Solution Recipe

| | Parts, by weight |
|---|---|
| Butadiene/styrene 75/25 block copolymer (a) | 17 |
| Styrene | 32.4 |
| Acrylonitrile | 10.8 |
| Methyl methacrylate | 39.7 |
| tert-Butyl 2-ethylperhexanoate | 0.4 |
| tert-Dodecyl thiol | 0.6 |
| bis($\alpha,\alpha$-dimethylbenzyl)peroxide | 0.1 |
| Antioxidant (b) | 1 |

(a) As described in Example I, Polymer Solution Recipe, Note (a)
(b) A mixture in 3/5/7 weight ratio, respectively, of 2,6-di-tert-butyl-4-methylphenol; dilaurylthiodipropionate; and tris-nonylphenyl phosphite.

Suspending Agent Recipe

| | Parts, by weight |
|---|---|
| Phosphoric acid solution | |
| Water | 150 |
| $H_3PO_4$ 85% | 0.744 |
| Calcium dispersion | |
| Water | 150 |
| $Ca(OH)_2$ | 0.738 |

The polymer solution was prepared by dissolving the rubber in a mixture of the monomers at 50° C. The mixture was cooled and the other polymer solution ingredients added. The suspending agent dispersion was prepared by adding the phosphoric acid solution to the $Ca(OH)_2$ dispersion with stirring. 300G of the suspending agent dispersion was added to 100 g of the polymer solution and the reactor flushed with nitrogen. The reaction mixture was brought to 80° C. and agitated at this temperature for 15 hours. To the reaction mixture then was added 2.5 ml. of 6N HCl, and the polymer beads separated by filtering. The polymer beads were washed with water and dried under vacuum at 80° C. Conversion of monomers was 88 percent.

A 65 g sample of the polymer was hot mixed in a Brabender Plastograph at 210° C. for 30 minutes at 150 rpm under nitrogen. The polymer was molded as described before into a test slab for physical property measurements.

TABLE VIII

| Run No. | Melt Flow g/10 min. | Modulus psi $\times 10^{-3}$ | Tensile psi | Elongation % | Izod Impact ft.lb/inch-notch |
|---|---|---|---|---|---|
| 17 | 0.77 | 279 | 4850 | 52 | 8.23 |

Along with the outstanding balance of properties as shown in Table VIII, this polymer was transparent having only 10.2 per cent haze (ASTM S 1003-52).

EXAMPLE IX

Other runs were made employing the method of preparing the suspending agent $Ca_3(PO_4)_2$ as described in Example VIII and employing a somewhat simplified method of polymer recovery. The recipes used in these runs are given below and the polymer properties given in Table IX.

Polymer Solution Recipe

|  | Parts, by weight |
|---|---|
| Butadiene/Styrene 75/25 block copolymer (a) | 15 |
| Styrene/acrylonitrile 70/30 mixture | 85 |
| tert-Dodecyl thiol | 0.4 |
| tert-Butyl 2-ethylperhexanoate | 0.4 |
| bis($\alpha,\alpha$-dimethylbenzyl)peroxide | variable |
| Antioxidant (b) | 1.25 |

(a) See Example I, Polymer Solution Recipe, Note (a).
(b) See Example VIII polymer solution recipe.

The polymer solution was prepared by dissolving the rubber in the mixture of styrene/acrylonitrile monomers after which the other components of the polymer solution recipe were added. The suspending agent was prepared in the manner as described in Example VIII. The suspending agent dispersion 300 g was added to 100 g of the polymer solution, and the mixture allowed to polymerize for 8 hours at 80° C. In these runs the polymer beads were recovered by filtration of the mixture, washing once, and then drying without the acidification step. Conversion of the monomers in each run was 89 percent.

Polymers from these runs were hot mixed in a Brabender Plastograph for 3 minutes at 150 rpm and at 210° C. with 0.5 part by weight of calcium stearate per 100 parts by weight of polymer, and sample specimens then were prepared. The properties of the polymers are presented in Table IX.

TABLE IX

| Run No. | Peroxide parts (a) | Melt Flow g/10 min. | Modulus psi × 10⁻³ | Tensile psi | Elong. % | Izod Impact ft.lb/in. notch |
|---|---|---|---|---|---|---|
| 18 | 0 | 2.58 | 329 | 6380 | 8 | 0.42 |
| 19 | 0.1 | 1.47 | 306 | 5990 | 23 | 4.64 |

(a) Parts by weight of bis($\alpha,\alpha$-dimethylbenzyl)peroxide per 100 parts by weight of polymer solution.

The results in Table IX further demonstrate the effect of the peroxide on impact strength when employed according to our invention. The results here as well as those from prior examples also demonstrate that the peroxy-oxygen containing compounds when added initially survive the polymerization conditions and are available for reaction in the hot mixing step. The peroxy compounds for cross-linking are activated by the higher temperatures of the hot mixing step which are higher than are employed for the polymerization step.

The polymeric products of this invention are high impact strength plastics with good flow properties and good color quality. As such, they can be employed for the extrusion and injection molding of containers, pipe, machine parts, furniture components, automobile dash panels, and the like, and can be electroplated, if desired.

Reasonable variations and modifications are possible within the scope of this disclosure without departing from the spirit and scope thereof.

We claim:

1. A method of preparing high impact polymer compositions which comprises dissolving at least one unsaturated rubber in at least one polymerizable vinylidene group-containing monomer to form a rubber-in-monomer solution, suspension polymerizing said rubber-in-monomer solution in the presence of a monomer-soluble organic azo or peroxy free radical generating initiator and in the further presence of a peroxy free radical cross-linking agent under aqueous suspension polymerization conditions including a polymerization temperature sufficient to activate said monomer-soluble organic azo or peroxy free radical initiator and wherein said polymerization temperature is below the activation temperature of said peroxy free radical cross-linking agent, thereby preparing a graft polymer, recovering the so-prepared graft polymer from said suspension polymerization system, and cross-linking the so-recovered graft polymer with said peroxy free radical cross-linking agent under hot-mixing conditions sufficient to activate said peroxy free radical cross-linking agent, thereby preparing said high impact polymer composition, wherein said unsaturated rubber is a natural rubber or synthetic rubber and where synthetic is a polymer of at least one conjugated diene of up to 12 carbon atoms per molecule; copolymer thereof with at least one monovinyl substituted aromatic compound, with at least 1-monoolefin of up to 8 carbon atoms per molecule, or with a nitrile group-containing monomer; and is characterized as having at least enough unsaturation to be vulcanizable, wherein said vinylidene group-containing monomer is characterized as polymerizable in the presence of said unsaturated rubber by thermal polymerization or in the presence of a monomer soluble free-radical generating initiator, and said vinylidene group-containing monomers containing 3 to 30 carbon atoms per molecule and comprise monovinyl-substituted aromatic compounds, alpha,beta-unsaturated nitriles, esters of acrylic acid, esters of alkacrylic acid, and vinyl esters, such that at least one said vinylidene group-containing monomer is an alpha, beta-unsaturated-nitrile, wherein said aqueous suspension polymerization conditions include employment of water as the continuous phase therein and said rubber-in-monomer solution as the discontinuous phase therein.

2. The process according to claim 1 wherein said polymerizable vinylidene group-containing monomer further can comprise a maleinimide, dialkyl maleate, or dialkyl fumarate.

3. The process according to claim 1 employing a mixture of polymerizable vinylidine group-containing monomers at least one of which is said alpha,beta-unsaturated nitrile monomer which constitutes up to about 95 percent by weight of said monomers.

4. The process according to claim 3 wherein said suspension polymerizing step is conducted under conditions substantially avoiding gel-formation.

5. The process according to claim 3 wherein said peroxy free radical generating crosslinking agent is incorporated in said process with said vinylidine group containing monomers.

6. The process according to claim 5 wherein said free radical crosslinking agent is employed in a range of from about 0.04 to 18.5 milligram equivalents of peroxy oxygen per 100 grams of polymer.

7. The process according to claim 6 wherein said free radical cross-linking agent is calcium peroxide, barium peroxide, zinc peroxide, or lead peroxide.

8. The process according to claim 6 wherein said free radical cross-linking agent is metnyl n-propyl peroxide, diethyl peroxide, dieicosyl peroxide, dicyclohexyl peroxide, bis(2,4,6-trimethylcyclohexyl)peroxide, bis(3,5-dichlorocyclohexyl) peroxide, bis(4-phenylcyclohexyl) peroxide, bis(4-octenyl) peroxide, dilauroyl peroxide, dibenzoyl peroxide, dicrotonyl peroxide, dibenzyl peroxide, methyl 2-n-propyl-3-butenyl peroxide, bis[diisopropyl(4-isopropylphenyl)methyl]peroxide, bis[-dimethyl-(4-tert-butylphenyl)methyl]peroxide, bis[(4-chlorobenzoyl)]peroxide, bis(2-propoxy-n-hexyl) peroxide, n-pentyl 5,8-diphenyldodecyl peroxide, bis(9,10-dihydroxydecyl) peroxide, bis(2-hydroxyheptyl) peroxide, eicosyl hydroperoxide, triacontanyl hydroperoxide, phenylcyclohexane hydroperoxide, 3-cyclohexenyl hydroperoxide, 4-cyclopentyl-n-butyl hydroperoxide, diisopropylbenzene hydroperoxide[-dimethyl-(4-isopropylphenyl)hydroperoxymethane], (4-ethoxyphenyl) methyl hydroperoxide, dimethyl(3-methoxyphenyl)hydroperoxymethane, peroxybenzoic acid, peroxybutyric acid, tert-butyl peroxybenzoate, di-tert-amyl diperoxyphthalate, or tert-dodecyl peroxyacetate.

9. The process according to claim 6 wherein said free radical cross-linking agent is bis(alpha,alpha-dimethylbenzyl) peroxide, di-tert-butyl peroxide, cumene hydroperoxide, tert-butyl hydroperoxide, or 2,5-dimethyl-2,5-di-tert-butylperoxyhexane.

10. The process according to claim 6 wherein said mixing at a temperature sufficient to activate said free radical cross-linking agent is at a temperature sufficient to flux the so-recovered polymer and to decompose the free radical generating cross-linking agent.

11. The process according to claim 10 wherein said temperature ranges up to about 350°C.

12. The process according to claim 11 wherein said temperature is in the range of about 150° to 300°C.

13. The process according to claim 5 wherein said rubber is butadiene/styrene copolymer or polybutadiene; said monomers are styrene and acrylonitrile, or styrene, acrylonitrile and methyl methacrylate, said initiator is benzoyl peroxide, α-(tert-butylazo)isobutyronitrile, or tert-butyl 2-ethyl perhexanote; and said cross-linking agent is bis(α,α-dimethylbenzyl peroxide.

14. The process of claim 3 wherein said alpha,beta-unsaturated nitrile monomer constitutes about 20 to 40 parts by weight per 100 parts of monomer mixture.

15. The process according to claim 1 wherein said rubber-in-monomer solution comprises from about 5 to 40 weight per cent of said rubber based on combined weight of said rubber and said monomers; said suspension polymerization process employs a suspending agent which is titanium dioxide or tricalcium phosphate, said suspension polymerization further employs a chain transfer agent.

16. The process according to claim 15 wherein said chain transfer agent comprises normal or tertiary alkyl mercaptan having from about 4 to 16 carbon atoms per molecule, lower alkyl xanthogens, α-bromoalkylbenzene, carbon polyhalides, and said chain transfer agent is employed in an amount sufficient to provide about 0.4 to 1.5 weight percent based on weight of combined monomer-rubber solution.

17. The process according to claim 15 wherein the amount of water in said continuous phase of said suspension polymerization system is equivalent to about 40 to 80 weight percent relative to the total weight of the monomer-elastomer mixture plus water.

18. The process according to claim 1 wherein said free-radical generating initiator is di-t-butylperoxide, benzoyl peroxide, lauroyl peroxide, oleyl peroxide, tolyl peroxide, di-t-butyl diperphthalate, t-butyl peracetate, t-butyl perbenzoate, dicumyl peroxide, t-butylperoxy isopropyl carbonate, 2,5-dimethyl-2,5-di(t-butylperoxy) hexane, 2,5-dimethyl-2,5-di(t-butylperoxy)hexyne-3, t-butylhydroperoxide, cumene hydroperoxide, p-menthane hydroperoxide, cyclopentane hydroperoxide, diisopropylbenzene hydroperoxide, p-t-butylcumene hydroperoxide, pinane hydroperoxide, 2,5-dimethylhexane-2,5-dihydroperoxide, or alpha-(t-butylazo)isobutyronitrile.

19. The method of preparing high impact polymer compositions which comprises dissolving an unsaturated rubber in at least one polymerizable vinylidene group-containing monomer to form a rubber-in-monomer solution, suspension polymerizing said rubber-in-monomer solution in the presence of an azo or peroxy monomer soluble organic free-radical generating initiator, in the further presence of a peroxy free-radical cross-linking agent, under aqueous suspension polymerization conditions of temperature and pressure sufficient to activate said monomer soluble organic initiator polymerize said rubber-in-monomer solution and wherein said polymerization temperature is less than the activation temperature of said free-radical generating cross-linking agent, recovering the so-prepared polymer product from said suspension polymerization system, and crosslinking the so-recovered polymer product by activating said peroxy free-radical cross-linking agent under hot-mixing conditions sufficient to activate said peroxy free-radical cross-linking agent, thereby preparing said high impact polymer composition, wherein said unsaturated rubber is a natural rubber or conjugated diene polymer and is characterized as a rubbery polymer having at least enough unsaturation to be vulcanizable, said vinylidene group-containing monomer comprises a monovinyl-substituted aromatic compound, alpha,beta-unsaturated nitrile, ester of acrylic acid, ester of alkacrylic acid, or vinyl ester, such that at least one said monomer is an alpha,-beta-unsaturated nitrile, and further can comprise a maleinimide, dialkyl maleate, or dialkyl fumarate, and wherein said aqueous suspension polymerization conditions include employment of water as the continuous phase therein and said rubber-in-monomer solution as the discontinuous phase therein.

20. Process according to claim 19 wherein said unsaturated rubber is characterized as a polymer of a conjugated diene of 4 to 12 carbon atoms per molecule, copolymer thereof with at least one monovinyl substituted aromatic compound, or with at least one 1-monoolefin of up to 8 carbon atoms per molecule, or with a nitrile group-containing monomer; or natural rubber; and wherein said polymerizable vinylidene group containing monomer contains up to 30 carbon atoms per molecule;

21. The process according to claim 20 wherein said rubber-in-monomer solution comprises about 5 to 40 weight percent of rubber based on combined weight of said rubber and polymerizable monomer; said polymerizable monomer comprises a mixture of at least two polymerizable monomers, at least one of which is a vinylidene nitrile containing monomer constituting up to about 95 weight percent of said monomer mixture;

22. The process according to claim 21 wherein said free-radical cross-linking agent is employed in the range of about 0.04 to 18.5 milligram equivalents of peroxy oxygen per 100 grams of polymer.

23. The process according to claim 22 wherein said suspension polymerization temperature is at least sufficient to induce decomposition of the free-radical initiator, below that which would cause gel formation in the elastomeric component, and said temperature further is below the activation temperature of said free-radical cross-linking agent.

24. The process according to claim 23 wherein said polymerization temperatures in the range of about 50° to 150°C, and said hot-mixing step is conducted at temperatures in the range of about 150° to 300°C.

25. The process according to claim 24 wherein said rubber is a butadiene/styrene copolymer or a polybutadiene; and said polymerizable monomer comprises styrene and acrylonitrile, or styrene, acrylonitrile and methyl methacrylate.

26. The process according to claim 25 wherein said free-radical initiator is benzoyl peroxide, or alpha-(tert-butylazo)isobutyronitrile, or tert-butyl 2-ethyl perhexanote, and said cross-linking agent is bis(a,a-dimethyl)benzyl peroxide.

* * * * *